US012711995B2

(12) United States Patent
Fortunato et al.

(10) Patent No.: US 12,711,995 B2
(45) **Date of Patent: *Aug. 18, 2026**

(54) INTERFACE FOR INDICATING VIDEO EDITING DECISIONS

(71) Applicant: GoPro, Inc., San Mateo, CA (US)

(72) Inventors: Steven Fortunato, Solana Beach, CA (US); Evan Kosowski, San Diego, CA (US); Rachael Irene Hines Thompson, Oceanside, CA (US); Thomas Achddou, Tréveneuc (FR); Pablo Lema, Burlingame, CA (US); Shinichi Kogi, Pleasant Grove, UT (US); Jean-Baptiste Noël, Le Vesinet (FR); Renaud Cousin, Verneuil sur Seine (FR); Nicolas Duponchel, Paris (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/036,572

(22) Filed: Jan. 24, 2025

(65) Prior Publication Data

US 2025/0174250 A1 May 29, 2025

Related U.S. Application Data

(63) Continuation of application No. 18/526,704, filed on Dec. 1, 2023, now Pat. No. 12,212,806, which is a continuation of application No. 17/885,814, filed on Aug. 11, 2022, now Pat. No. 11,837,259, which is a continuation of application No. 17/204,908, filed on Mar. 17, 2021, now Pat. No. 11,430,484.

(51) Int. Cl.
*G11B 27/031* (2006.01)
*G06F 3/04847* (2022.01)
*G11B 27/34* (2006.01)
*H04N 21/43* (2011.01)
*H04N 21/431* (2011.01)

(52) U.S. Cl.
CPC ........ *G11B 27/031* (2013.01); *G06F 3/04847* (2013.01); *G11B 27/34* (2013.01); *H04N 21/43074* (2020.08); *H04N 21/4318* (2013.01)

(58) Field of Classification Search
CPC .... G11B 27/031; G11B 27/34; G06F 3/04847
See application file for complete search history.

(56) References Cited

U.S. PATENT DOCUMENTS

2011/0138282 A1* 6/2011 Lai ........................ G06F 40/169 715/716
2018/0295428 A1* 10/2018 Bi ........................ H04N 21/8153

* cited by examiner

*Primary Examiner* — Girumsew Wendmagegn
(74) *Attorney, Agent, or Firm* — Esplin & Associates, PC

(57) ABSTRACT

A video edit may include one or more segment of a video. A graphical user interface may convey information that indicates video editing decisions made to generate the video edit. The graphical user interface may include a timeline element to represent the length of the video and one or more inclusion elements to visually indicate the segment(s) of the video included in the video edit. The graphical user interface may convey information on the segment(s) of the video that have been automatically included in the video edit and the segment(s) of the video that have been manually included in the video edit.

20 Claims, 7 Drawing Sheets

METHOD 200

201 Obtain video edit information defining a video edit of a video, the video having a progress length, the video edit of the video including one or more segments of the video that have been selected for inclusion in the video edit.

202 Present a graphical user interface on a display, the graphical user interface including interface elements that convey information relating to the video edit, the interface elements including a timeline element that represents the progress length of the video and one or more inclusion elements that visually indicate the segment(s) of the video that have been selected for inclusion in the video edit.

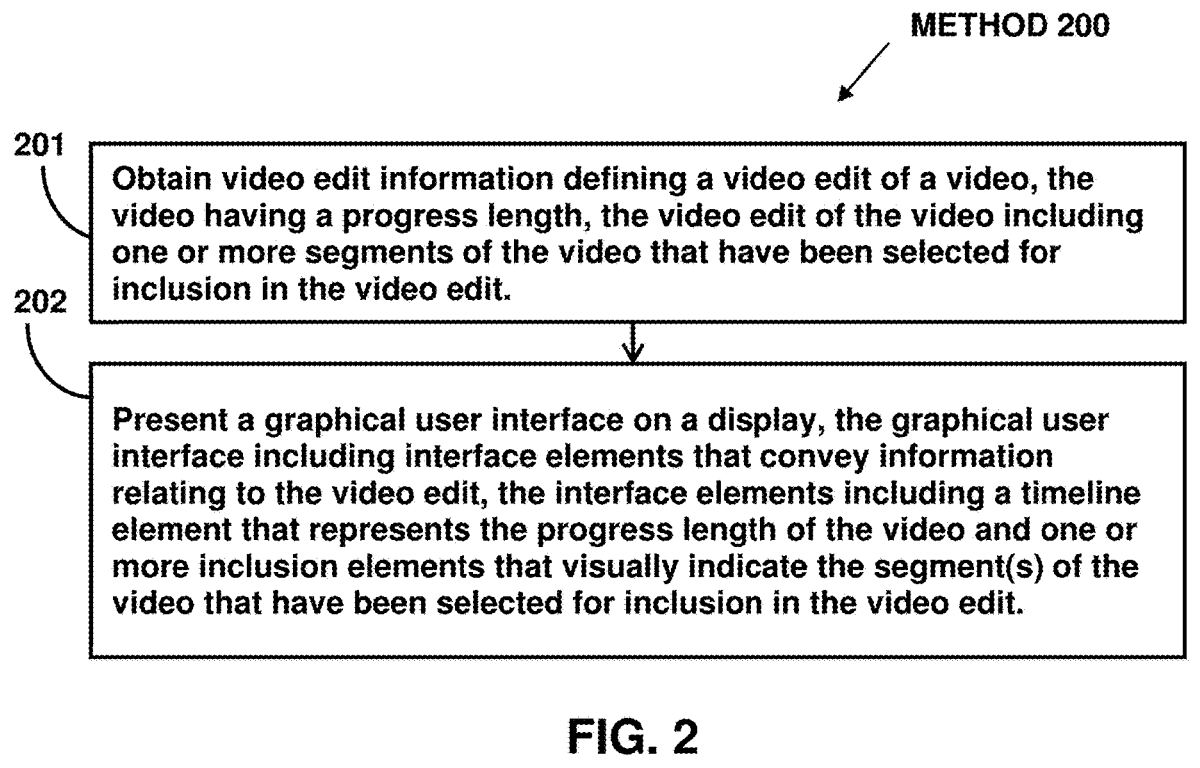

METHOD 200

201

Obtain video edit information defining a video edit of a video, the video having a progress length, the video edit of the video including one or more segments of the video that have been selected for inclusion in the video edit.

202

Present a graphical user interface on a display, the graphical user interface including interface elements that convey information relating to the video edit, the interface elements including a timeline element that represents the progress length of the video and one or more inclusion elements that visually indicate the segment(s) of the video that have been selected for inclusion in the video edit.

FIG. 2

INTERFACE FOR INDICATING VIDEO EDITING DECISIONS

FIELD

This disclosure relates to an interface for indicating video editing decisions.

BACKGROUND

A video application may automatically generate a video edit from video clips. It may be desirable to provide to users with information on how the video edit was generated.

SUMMARY

This disclosure relates to an interface for indicating video editing decisions. Video edit information and/or other information may be obtained. The video edit information may define a video edit of a video. The video may have a progress length. The video edit of the video may include one or more segments of the video that have been selected for inclusion in the video edit. A graphical user interface may be presented on a display. The graphical user interface may include interface elements that convey information relating to the video edit. The interface elements may include a timeline element that represents the progress length of the video. The interface elements may include one or more inclusion elements that visually indicate the segment(s) of the video that have been selected for inclusion in the video edit.

A system that presents an interface for indicating video editing decisions may include one or more electronic storage, processor, and/or other components. The electronic storage may store video edit information, information relating to one or more video edits, information relating to one or more graphical user interfaces, information relating to one or more interface elements, and/or other information.

The processor(s) may be configured by machine-readable instructions. Executing the machine-readable instructions may cause the processor(s) to facilitate presenting an interface for indicating video editing decisions. The machine-readable instructions may include one or more computer program components. The computer program components may include one or more of a video edit information component, a graphical user interface component, and/or other computer program components.

The video edit information component may be configured to obtain video edit information and/or other information. The video edit information may define a video edit of a video. The video may have a progress length. The video edit of the video may include one or more segments of the video that have been selected for inclusion in the video edit.

In some implementations, the segment(s) of the video that have been selected for inclusion in the video edit may include an automatically selected segment of the video. In some implementations, the segment(s) of the video that have been selected for inclusion in the video edit may include a manually selected segment of the video.

The graphical user interface component may be configured to present a graphical user interface on a display. The graphical user interface may include interface elements that convey information relating to the video edit. The interface elements may include a timeline element that represents the progress length of the video. The interface elements may include one or more inclusion elements that visually indicate the segment(s) of the video that have been selected for inclusion in the video edit.

In some implementations, the inclusion element(s) may include an automatic inclusion element that visually indicates an automatically selected segment of the video. In some implementations, the inclusion element(s) may include a manual inclusion element that visually indicates a manually selected segment of the video.

In some implementations, the graphical user interface may further include an automatic selection element. The automatic selection element may enable a user to turn on or turn off automatic selection of video segments for inclusion in the video edit. One or more automatic inclusion elements may disappear responsive to the user turning off the automatic selection of video segments for inclusion in the video edit via user interaction with the automatic selection element.

In some implementations, a manual inclusion element may include one or more shoulder elements. Individual shoulder element may visually represent a portion of the video that has not been manually selected for inclusion in the video edit. Individual shoulder element may visually represent a portion of the video that have been automatically selected for inclusion in the video edit to maintain synchronization between the manually selected segment of the video with a music of the video edit.

In some implementations, the graphical user interface may further include a music-synchronization element. The music-synchronization element may enable a user to turn on or turn off synchronization between the music of the video edit and the segment(s) of the video that have been selected for inclusion in the video edit.

In some implementations, a manual inclusion element may include shoulder element(s) based on the synchronization between the music of the video edit and the segment(s) of the video that have been selected for inclusion in the video edit being turned on. The shoulder element(s) may disappear responsive to the user turning off the synchronization between the music of the video edit and the segment(s) of the video that have been selected for inclusion in the video edit via user interaction with the music-synchronization element.

In some implementations, an automatic inclusion element may not include any shoulder elements regardless of whether the synchronization between the music of the video edit and the segment(s) of the video that have been selected for inclusion in the video edit is turned on or turned off.

In some implementations, the graphical user interface may enable user interaction with an automatic inclusion element to change an automatically selected segment of the video. Responsive to the user interaction with the automatic inclusion element to change the automatically selected segment of the video: the automatically selected segment of the video may change into a manually selected segment of the video, and the automatic inclusion element may change into a manual inclusion element that visually indicates the manually selected segment of the video.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 2 illustrates a method for presenting an interface for indicating video editing decisions.

DETAILED DESCRIPTION

Figure 1:
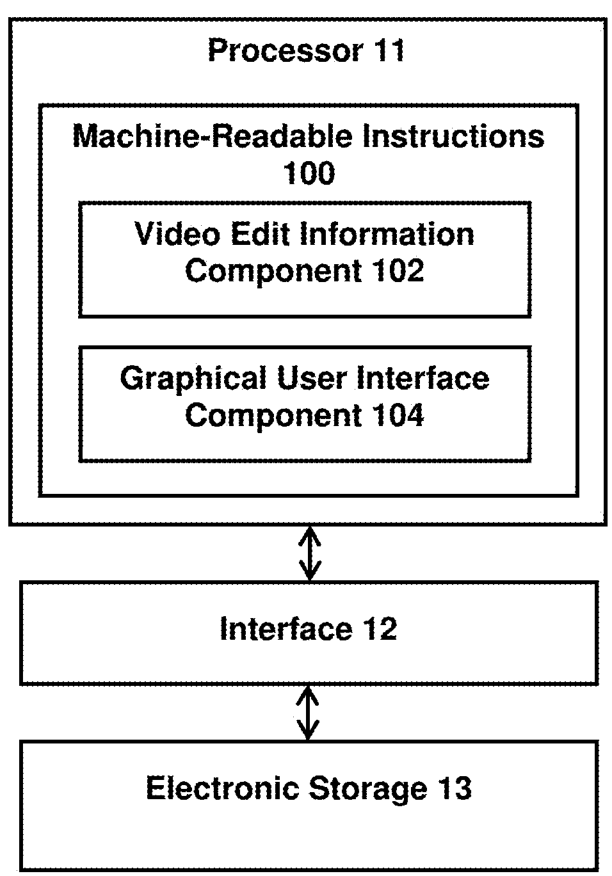
FIG. 1 illustrates a system that presents an interface for indicating video editing decisions.

FIG. 1 illustrates a system 10 that presents an interface for indicating video editing decisions. The system 10 may include one or more of a processor 11, an interface 12 (e.g., bus, wireless interface), an electronic storage 13, and/or other components. Video edit information and/or other information may be obtained by the processor 11. The video edit information may define a video edit of a video. The video may have a progress length. The video edit of the video may include one or more segments of the video that have been selected for inclusion in the video edit. A graphical user interface may be presented on a display by the processor 11. The graphical user interface may include interface elements that convey information relating to the video edit. The interface elements may include a timeline element that represents the progress length of the video. The interface elements may include one or more inclusion elements that visually indicate the segment(s) of the video that have been selected for inclusion in the video edit.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video edit information, information relating to one or more video edits, information relating to one or more graphical user interfaces, information relating to one or more interface elements, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate presenting an interface for indicating video editing decisions. The machine-readable instructions 100 may include one or more computer program components. The machine-readable instructions 100 may include one or more of a video edit information component 102, a graphical user interface component 104, and/or other computer program components.

The video edit information component 102 may be configured to obtain video edit information and/or other information. Obtaining video edit information may include one or more of accessing, acquiring, analyzing, determining, examining, identifying, loading, locating, opening, receiving, retrieving, reviewing, selecting, storing, and/or otherwise obtaining the video edit information. The video edit information component 102 may obtain video edit information from one or more locations. For example, the video edit information component 102 may obtain video edit information from a storage location, such as the electronic storage 13, electronic storage of information and/or signals generated by one or more sensors, electronic storage of a device accessible via a network, and/or other locations. The video edit information component 102 may obtain video edit information from one or more hardware components (e.g., an image sensor, a processor) and/or one or more software components (e.g., software running on a computing device).

In some implementations, the video edit information component 102 may obtain video edit information based on user interaction with a user interface/application (e.g., video editing application, video player application), and/or other information. For example, a user interface/application may provide option(s) for a user to edit videos. The video edit information for a video may be obtained based on the user's selection of the video edit of the video and/or the user's selection of the video through the user interface/video application. Other selections of a video edit for retrieval of video edit information are contemplated.

The video edit information may define a video edit of one or more videos. A video may have a progress length. The progress length of a video may be defined in terms of time durations and/or frame numbers. For example, a video may have a time duration of 60 seconds. A video may have 1800 video frames. A video having 1800 video frames may have a play time duration of 60 seconds when viewed at 30 frames per second. Other progress lengths, time durations, and frame numbers are contemplated.

Content of one or more videos may be referred to as video content. Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

A video edit of a video may refer to an arrangement and/or a manipulation of one or more segments of the video. A video edit of a video may include one or more segments of the video that have been selected for inclusion in the video edit. A segment of a video may include a point in time or a duration within the progress length of the video. A segment of a video may include a single video frame or multiple video frames of the video. The video edit information may define a video edit by including information that defines one or more content, qualities, attributes, features, and/or other aspects of the video edit. For example, the video edit information may define a video edit by including information that makes up the content of the video edit and/or information that is used to determine the content of the video edit. For instance, the video edit information may include information that makes up and/or is used to determine the arrangement and/or the manipulation of segment(s) of a video that make up the video, such as information that identifies and/or is used to identify which segments of the video are included in the video edit and/or the arrangement/manipulation of the segments in the video edit. Other types of video edit information are contemplated.

The video edit information may be stored within a single file or multiple files. For example, video edit information defining a video edit of a video may be stored within a video edit file, multiple video edit files, a combination of different files, and/or other files. The video edit information may be stored in one or more formats or containers.

In some implementations, segment(s) of a video that have been selected for inclusion in the video edit may include one or more automatically selected segments of the video. An automatically selected segment of the video may refer to a segment of the video that is automatically selected for inclusion in the video edit. The automatically selected segment of the video may be selected for inclusion in the video edit by a computing device/component, such as the processor 11. The automatically selected segment of the video may be selected for inclusion in the video edit based on one or more criteria, such as length of the video, the desired length of the video edit, the length of the segment, occurrence of a highlight event within the segment, content depicted within the segment, metadata for the segment, and/or other criteria.

In some implementations, segment(s) of a video that have been selected for inclusion in the video edit may include one or more manually selected segments of the video. A manually selected segment of the video may refer to a segment of the video that is manually selected for inclusion in the video edit. The manually selected segment of the video may be selected for inclusion in the video by a user, such as via interaction with a user interface/application (e.g., video editing application, video player application).

The graphical user interface component 104 may be configured to present one or more graphical user interfaces on one or more displays. A display may refer to an electronic device that provides visual presentation of information. A display may be configured to present visual content, graphical user interface(s), and/or other information. In some implementations, a display may include a touchscreen display. A touchscreen display may be configured to receive user input via a user's engagement with the touchscreen display. A user may engage with the touchscreen display via interaction with one or more touch-sensitive surfaces/screens and/or other components of the touchscreen display. A display may be a standalone device or a component of a computing device, such as a display of a mobile device (e.g., camera, smartphone, smartwatch, tablet, laptop) or a desktop device (e.g., touch monitor). User interaction with elements of the graphical user interface(s) may be received through the display (e.g., touchscreen display) and/or other user interface devices (e.g., keyboard, mouse, trackpad).

In some implementations, the visual content of video/video edit may be presented on the display(s). In some implementations, the visual content of video/video edit may be within the graphical user interface(s). In some implementations, one or more lower fidelity versions of the visual content may be generated for presentation. A lower fidelity version of the visual content may refer to a version (e.g., copy) of the visual content that is reproduced with less quality than the original visual content. For example, a lower fidelity version of the visual content may include a lower resolution version of the visual content, a lower framerate version of the visual content, and/or other lower-quality version of the visual content.

A graphical user interface may refer to a user interface that enables a user to interact with the system 10 through one or more interface elements. A graphical user interface may refer to a user interface that enables the system 10 to provide information to a user through one or more interface elements. A graphical user interface may include interface elements. A graphical user interface may be static or dynamic. A graphical user interface may include a static configuration of interface elements and/or include dynamic configurations of interface elements that changes (e.g., with time, based on user interaction with one or more interface elements). Multiple/different interface elements may be presented/included within a graphical user interface at the same time, may be presented/included within a graphical user interface at different times, and/or may be presented/included within a graphical user interface responsive to user interaction with one or more other interface elements and/or other information.

An interface element may refer to a graphical element of the user interface, such as window, icon, button, graphic, and/or other visual indicator. An interface element may visually provide information and/or enable a user to provide inputs to the system 10. For example, an interface element may visually provide information determined by the system 10 and/or a user may interact (e.g., engage, toggle, manipulate) with an interface element to provide one or more input to the system 10. A graphical user interface may facilitate interaction of the user with one or more of the interface elements via the user input received through one or more user interface devices (e.g., touchscreen display, keyboard, mouse, trackpad) and/or other user input. For example, a graphical user interface may present/include the interface elements in a particular arrangement and enable the user to interact with individual interface elements by engaging with locations corresponding to the individual interface elements on a touchscreen display.

A graphical user interface may include interface elements that convey information relating to the video edit. Information relating to the video edit may refer to information relating to content of the video edit, information relating to the video from which the video edit is generated, information relating to usage of the video edit (e.g., presentation of the video edit, storage of the video edit), and/or other information relating to the video edit. The interface elements conveying information relating to the video edit may include the interface elements conveying information relating to video editing decisions made in generating the video edit. A video editing decision may refer to a decision on how one or more videos are edited into the video edit. A video editing decision may include an automatic video editing decision (e.g., edits made by video engine/software/video editing algorithm), a manual video editing decision (e.g., edits made by a user), and/or other video editing decision. The interface elements may provide information on how the video(s) have and/or are being edited to generate the video edit. The interface elements may visually indicate inputs to the video edit generation and/or how the inputs were utilized to generate the video edit.

In some implementations, one or more interface elements may be manipulable to change the video edit. For example, an interface element may visually represent a video editing decision, and a user may interact with the interface element to change the video editing decision represented by the interface element. For example, an interface element may represent a video editing decision to include a particular segment of a video in the video edit. The interface element may be manipulable by a user to change to segment of the video to be included in the video edit (e.g., change length of the segment, change location of the segment, remove the segment from video edit).

The interface elements may include one or more timeline elements and/or other interface elements. A timeline element may refer to an interface element that visually represents the progress length (e.g., duration) of one or more videos. A timeline element that represents the progress length of one or more videos. A timeline element may represent the progress length of a single video (e.g., a separate timeline element for individual video) or multiple videos (e.g., a single timeline element to represent combined progress lengths of multiple videos). A timeline element may represent the progress length of a video may representing the entire progress length of the video or representing a portion of the progress length of the video. For example, a length of the timeline element may represent the entire progress length of the video or a portion of the progress length of the video.

The interface elements may include one or more inclusion elements and/or other interface elements. An inclusion element may refer to an interface element that visually indicates (represents) a segment of the video(s) that have been selected for inclusion in the video edit. An inclusion element may visually indicate a location and/or a length of a segment of the video(s) that has been selected for inclusion in the video edit. An inclusion element may be positioned within, along, above, below, and/or otherwise with respect to the timeline element to visually indicate that segment of the video(s) that have been selected for inclusion in the video edit. An inclusion element may be positioned with respect to the timeline element to visually mark/distinguish the segment of the video that has been selected for inclusion in the video edit.

In some implementations, the inclusion element(s) may include one or more automatic inclusion elements. An automatic inclusion element may refer to an inclusion element that visually indicates an automatically selected segment of the video. An automatic inclusion element may visually indicate a location and/or a length of a segment of the video(s) that has been automatically selected for inclusion in the video edit.

In some implementations, the graphical user interface may further include an automatic selection element. An automatic selection element may refer to an interface element that enables a user to control whether or not one or more segments of the video(s) are automatically selected for inclusion in the video edit. The automatic selection element may enable a user to turn on or turn off automatic selection of video segments for inclusion in the video edit. For example, a user may be able to turn on/off the automatic selection of video segments for inclusion in the video edit by pressing, sliding, toggling, and/or otherwise interacting with the automatic selection element.

Responsive to the automatic selection of video segments being turned on (e.g., by default, based on the user turning on the automatic settlement of video segments for inclusion in the video edit via user interaction with the automatic selection element), one or more segments of the video(s) may be automatically selected. Responsive to the automatic selection of video segments being turned on, one or more automatic inclusion elements for the automatically selected segment(s) may appear within the graphical user interface.

Responsive to the automatic selection of video segments being turned off (e.g., by default, based on the user turning off the automatic settlement of video segments for inclusion in the video edit via user interaction with the automatic selection element), segment(s) of the video(s) may not be automatically selected. Responsive to the automatic selection of video segments being turned off, one or more automatic inclusion elements may disappear from the graphical user interface.

In some implementations, the inclusion element(s) may include one or more manual inclusion elements. A manual inclusion element may refer to an inclusion element that visually indicates a manually selected segment of the video. A manual inclusion element may visually indicate a location and/or a length of a segment of the video(s) that has been manually selected for inclusion in the video edit. In some implementations, one or more visual characteristics of the automatic inclusion element may be the same as one or more visual characteristics of the manual inclusion element. In some implementations, the one or more visual characteristics of the automatic inclusion element may be different from one or more visual characteristics of the manual inclusion element. Presentation of the automatic inclusion elements and the manual inclusion elements may enable a user to quickly determine (1) which segments of the video(s) have been automatically selected for inclusion in the video edit, and (2) which segments of the video(s) have been manually selected for inclusion in the video edit.

In some implementations, a manual inclusion element may include (e.g., combined with, augmented by, presented with) one or more shoulder elements. A shoulder element may refer to an interface element that laterally projects outs from a manual inclusion element. A shoulder element may refer to an interface element that is positioned at an end of a manual inclusion element. A shoulder element may visually represent a portion (e.g., a point in time, a duration) of the video adjacent to the segment of the video that has been manually selected for inclusion in the video edit. The portion of the video visually represented by the shoulder element may not have been manually selected for inclusion in the video edit. That is, a shoulder element may visually represent a portion of the video that has not been manually selected for inclusion in the video edit.

Instead, the portion of the video visually represented by the shoulder element may have been automatically selected for inclusion in the video edit. The portion of the video visually represented by the shoulder element may have been automatically selected for inclusion in the video edit based on the manual selection of the adjacent segment of the video. The portion of the video visually represented by the shoulder element may have been automatically selected for inclusion in the video edit to maintain synchronization between the manually selected segment of the video (and/or other segments of the video included in the video edit) with a music of the video edit.

The music of the video edit may refer to a music that accompanies playback/presentation of the video edit. The music of the video edit may refer to music that a music that provides sound (e.g., soundtrack) for the video edit. The video edit may be generated so that the segments of the video(s) included in the video edit are synchronized to the music. For example, events within the segments and/or transitions between the segments may occur at the same time as events (e.g., beat, melody, rhythm) within the music. For example, the length of the segments that are automatically selected for inclusion in the video may be controlled/adjusted so that the automatically selected segments are synchronized to the music.

The length of the manual segment of the video may make it difficult or impossible to achieve synchronization with the music. To maintain music synchronization for the video edit, one or more portions of the video adjacent to the manually selected segment may be added to the video edit. That is, portion(s) of the video adjacent to the manually selected segment may be automatically included in the video edit to synchronize the manually selected segment (and/or other segments) to the music. The portion(s) of the video that are automatically included in the video edit to enable music synchronization may include a portion of the video preceding the manually selected segment and/or a portion of the video following the manually selected segment. Thus, the video edit may include a larger segment of the video than was manually selected by the user, with the larger segment of the video enabling music synchronization in the video edit to be maintained. A shoulder element may visually represent a portion of the video that has been automatically selected for inclusion in the video edit to maintain synchronization between the manually selected segment of the video (and/or other segments of the video included in the video edit) with the music of the video edit.

Presentation of the shoulder element(s) with the manual inclusion elements may enable a user to quickly determine (1) which segment of the video(s) have been manually selected for inclusion in the video edit, and (2) which portions of the video(s) have been automatically selected for inclusion in the video edit to maintain music synchronization—that is, which portions of the video(s) that were originally not selected for inclusion in the video edit were added to the video edit to maintain music synchronization.

In some implementations, the graphical user interface may further include a music-synchronization element. A music-synchronization element may refer to an interface element that enables a user to control whether or not music synchronization (synchronization between the music of the video edit and the segment(s) of the video(s) that have been selected for inclusion in the video edit) is performed. The music-synchronization element may enable a user to turn on or turn off synchronization between the music of the video edit and the segment(s) of the video(s) that have been selected for inclusion in the video edit. For example, a user may be able to turn on/off music synchronization by pressing, sliding, toggling, and/or otherwise interacting with the music-synchronization element.

Responsive to the music synchronization being turned on (e.g., by default, based on the user turning on the music synchronization via user interaction with the music-synchronization element), the segment(s) of the video(s) that have been selected for inclusion in the video edit may be synchronized to the music of the video edit. Responsive to the music synchronization being turned on, the manual inclusion element(s) may include the shoulder element(s). That is, the shoulder element(s) may appear within the graphical user interface (with the manual inclusion element(s)) based on the music synchronization being turned on.

Responsive to the music synchronization being turned off (e.g., by default, based on the user turning off the music synchronization via user interaction with the music-synchronization element), the segment(s) of the video(s) that have been selected for inclusion in the video edit may not be synchronized to the music of the video edit. Responsive to the music synchronization being turned off, the manual inclusion element(s) may not include the shoulder element(s). That is, the shoulder element(s) may disappear from the graphical user interface based on the music synchronization being turned off.

The automatic inclusion element(s) may not include any shoulder elements. The length of the automatically selected segment(s) of the video may take into account music synchronization, and additional portion(s) of the video may not need to be added to the video edit to maintain music synchronization. Thus, the automatic inclusion element(s) may not include any shoulder elements regardless of whether the music synchronization is turned on or turned off.

In some implementations, the graphical user interface may enable user interaction with one or more automatic inclusion elements to change one or more automatically selected segments of the video. For example, the graphical user interface may enable user interaction with an automatic inclusion element to change the location of the automatic inclusion element to change location of the video segment that is included in the video edit. The graphical user interface may enable user interaction with an automatic inclusion element to change the size of the automatic inclusion element to change length of the video segment that is included in the video edit. Other changes to the automatic inclusion element are contemplated.

Responsive to the user interaction with an automatic inclusion element to change the corresponding automatically selected segment of the video, the automatically selected segment of the video may change into a manually selected segment of the video. That is, user modification of an automatically selected segment of the video (via user interaction with the automatic inclusion element) may case the automatically selected segment to change into a manually selected segment. Responsive to the user interaction with an automatic inclusion element to change the corresponding automatically selected segment of the video, the automatic inclusion element may change into a manual inclusion element that visually indicates the manually selected segment of the video. That is, the automatic inclusion element may be changed into the manual inclusion element that visually indicates the newly converted manually selected segment of the video. Conversion of a segment of the video from being an automatically selected segment to a manually selected segment may cause, responsive to the music synchronization being turned on, one or more shoulder elements to be appear for the segment of the video.

FIGS. 3A, 3B, 3C, 3D, and 3E illustrates an example graphical user interface 300 for indicating video editing decisions. The views of the graphical user interface 300 in FIGS. 3A, 3B, 3C, 3D, and 3E are provided merely as examples, and the arrangement and visual aspects of the graphical user interface may vary depending on the implementation. In some implementations, the graphical user interface may include additional features and/or alternative features. In some implementations, the graphical user interface may not include features shown in FIGS. 3A, 3B, 3C, 3D, and 3E.

Figure 3A:
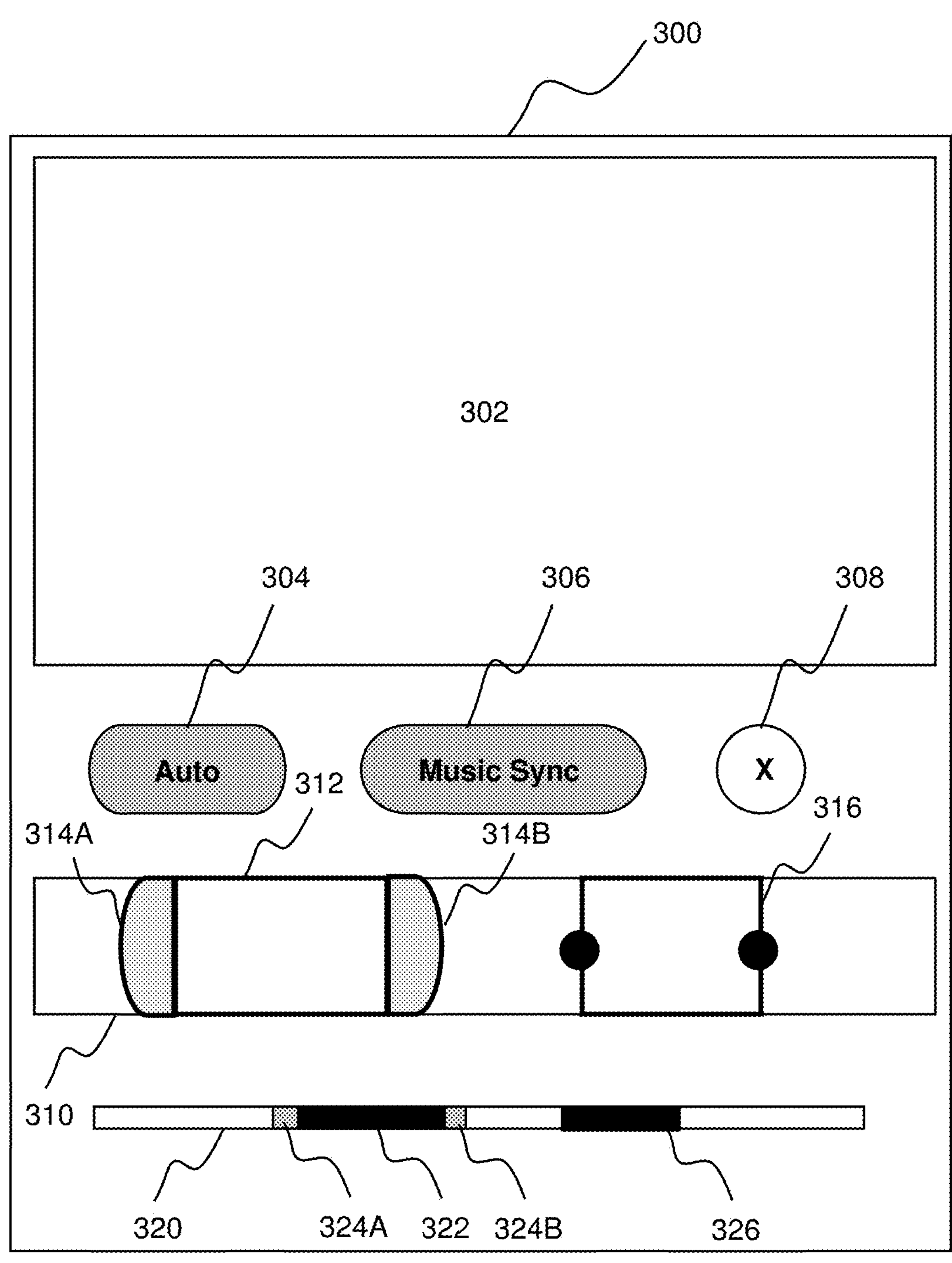
FIG. 3A illustrates example graphical user interface for indicating video editing decisions.

Referring to FIG. 3A, the graphical user interface 300 may include a visual content playback portion 302. The visual content playback portion 302 may include presentation of visual content (visual content of video(s), visual content of a video edit). The graphical user interface 300 may include a timeline element 310. The timeline element 310 may represent the progress length of the video being edited. In some implementations, only a portion of the progress length of the video (e.g., zoomed in portion of the progress length) may be represented at a time by the timeline element. One or more inclusion elements may be presented within/along the timeline element 310 to visually indicate one or more segments of the video that have been selected for inclusion in the video edit.

In FIG. 3A, the inclusion elements may include a manual inclusion element 312 and an automatic inclusion element 316. The manual inclusion element 312 may visually indicate the location of a manually selected segment of the video within the progress length of the video, and the length of the manually selected segment of the video. The automatic inclusion element 316 may visually indicate the location of an automatically selected segment of the video within the progress length of the video, and the length of the automatically selected segment of the video.

Shoulder elements 314A, 314B may be presented adjacent to the manual inclusion element 312 to visually indicate/represent portions of the video that were not manually selected, but were automatically selected to maintain music synchronization in the video edit. In some implementations, the size (e.g., length) of the shoulder elements 314A, 314B may visually indicate/represent the amount (e.g., length) of the portions that were added to the video edit for music synchronization. Shoulder elements may not be presented adjacent to the automatic inclusion element 316.

While the shoulder elements 314A, 314B are shown in FIG. 3A as being of same size, this is merely as an example and is not meant to be limiting. In some implementation, same amount of video portions may be added before and after a manually selected segment for music synchronization. In some implementation, different amounts of video portions may be added before and after a manually selected segment for music synchronization. In some implementations, a video portion may be added before or after (but not before and after) a manually selected segment for music synchronization.

The graphical user interface 300 may include a summary timeline element 320. The summary timeline element 320 may represent the progress length of the video being edited. The summary timeline element 320 may represent the entire progress length of the video being edited. One or more summary inclusion elements may be presented within/along the summary timeline element 320.

In FIG. 3A, the summary inclusion elements may include a summary manual inclusion element 322 and a summary automatic inclusion element 326. The summary manual inclusion element 322 may correspond to the inclusion element 312, and the summary automatic inclusion element 326 may correspond to the inclusion element 316. The summary manual inclusion element 322 may visually indicate the location of a manually selected segment of the video within the progress length of the video, and the length of the manually selected segment of the video. The summary automatic inclusion element 326 may visually indicate the location of an automatically selected segment of the video within the progress length of the video, and the length of the automatically selected segment of the video. Summary shoulder elements 324A, 324B may be presented adjacent to the summary manual inclusion element 322 to visually indicate/represent portions of the video that were not manually selected, but were automatically selected to maintain music synchronization in the video edit. Summary shoulder elements may not be presented adjacent to the summary automatic inclusion element 326.

The graphical user interface 300 may include an automatic selection element 304, a music-synchronization element 306, and a delete element 308. The automatic selection element 304 may enable a user to turn on or turn off automatic selection of video segments for inclusion in the video edit. The music-synchronization element 306 may enable a user to turn on or turn off music synchronization in the video edit (synchronization between the music of the video edit and the segment(s) of the video that have been selected for inclusion in the video edit). The delete element 308 may enable a user to remove (unselect) the segment(s) of the video from being included in the video edit.

Figure 3B:
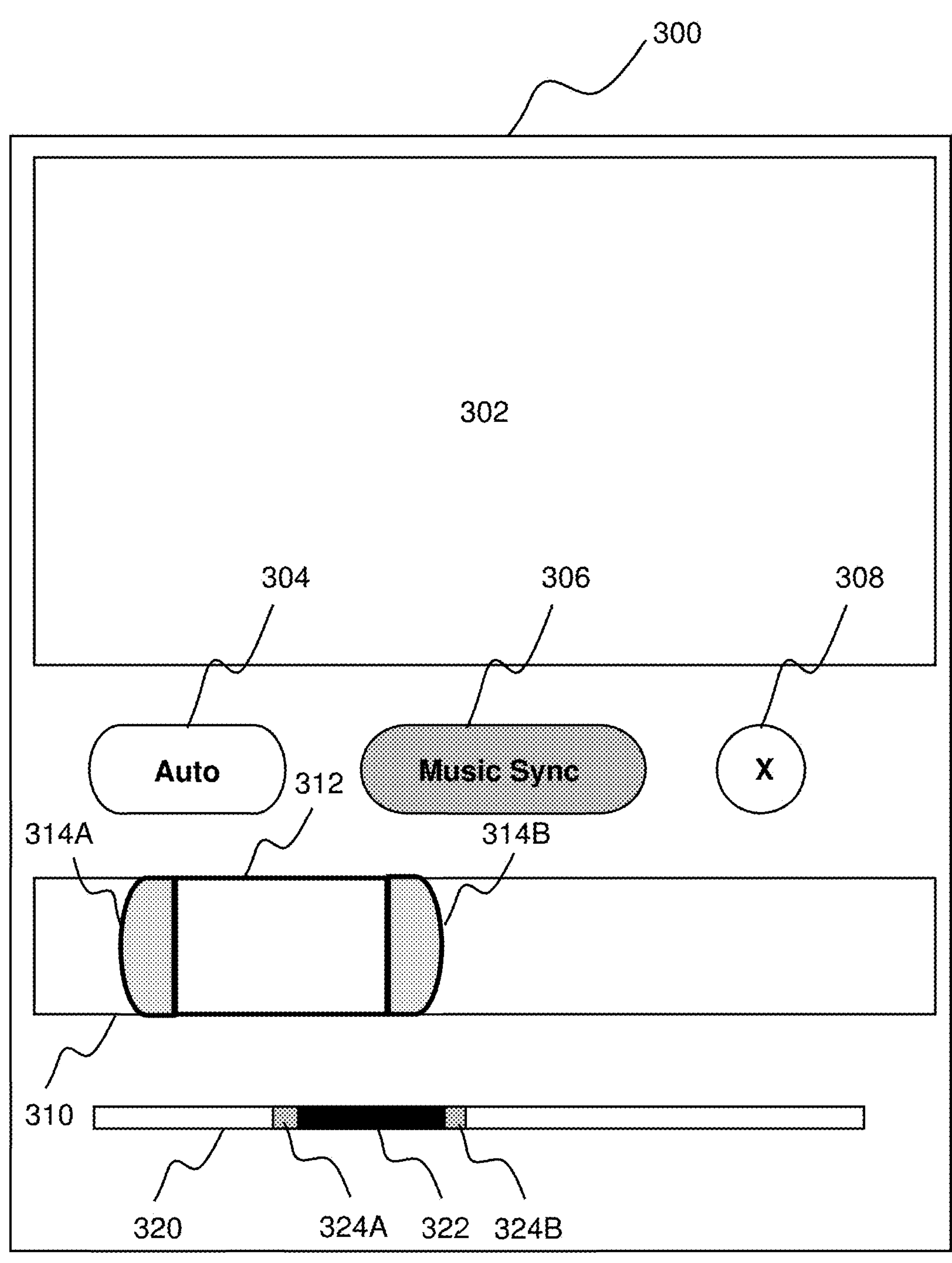
FIG. 3B illustrates example graphical user interface for indicating video editing decisions.

For example, in FIG. 3A, the automatic inclusion element 316 and the summary automatic inclusion element 326 may appear within the graphical user interface 300 responsive to the automatic selection of video segments being turned on. Referring to FIG. 3B, the automatic inclusion element 316 and the summary automatic inclusion element 326 may disappear from the graphical user interface 300 responsive to the automatic selection of video segments being turned off (e.g., via user interaction with the automatic selection element 304).

Figure 3C:
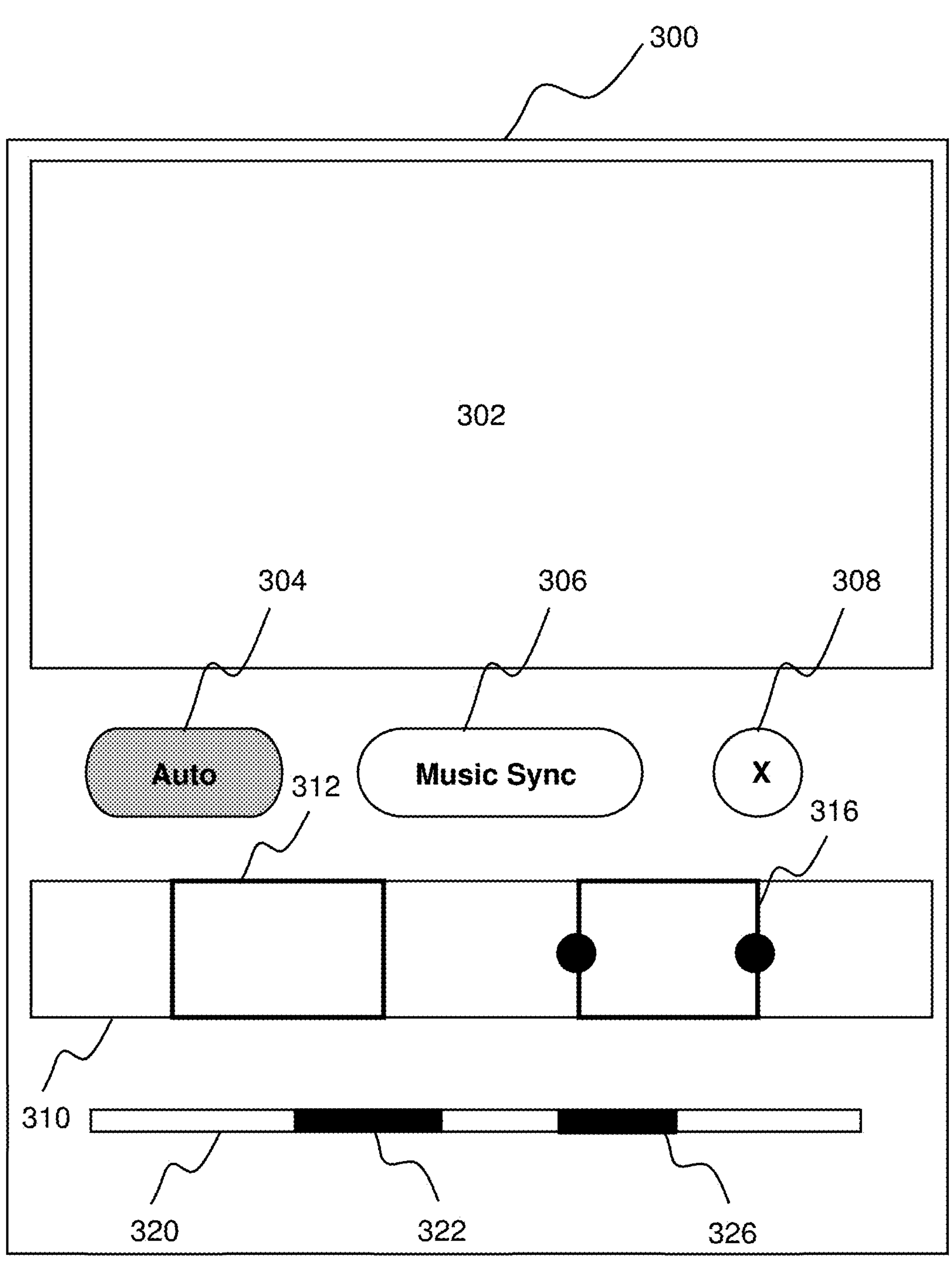
FIG. 3C illustrates example graphical user interface for indicating video editing decisions.

In FIG. 3A, the shoulder elements 314A, 314B and the summary shoulder elements 324A, 324B may appear within the graphical user interface 300 responsive to the music synchronization in the video edit being turned on. Referring to FIG. 3C, the shoulder elements 314A, 314B and the summary shoulder elements 324A, 324B may disappear from the graphical user interface 300 responsive to the music synchronization in the video edit being turned off (e.g., via user interaction with the music-synchronization element 306).

Figure 3D:
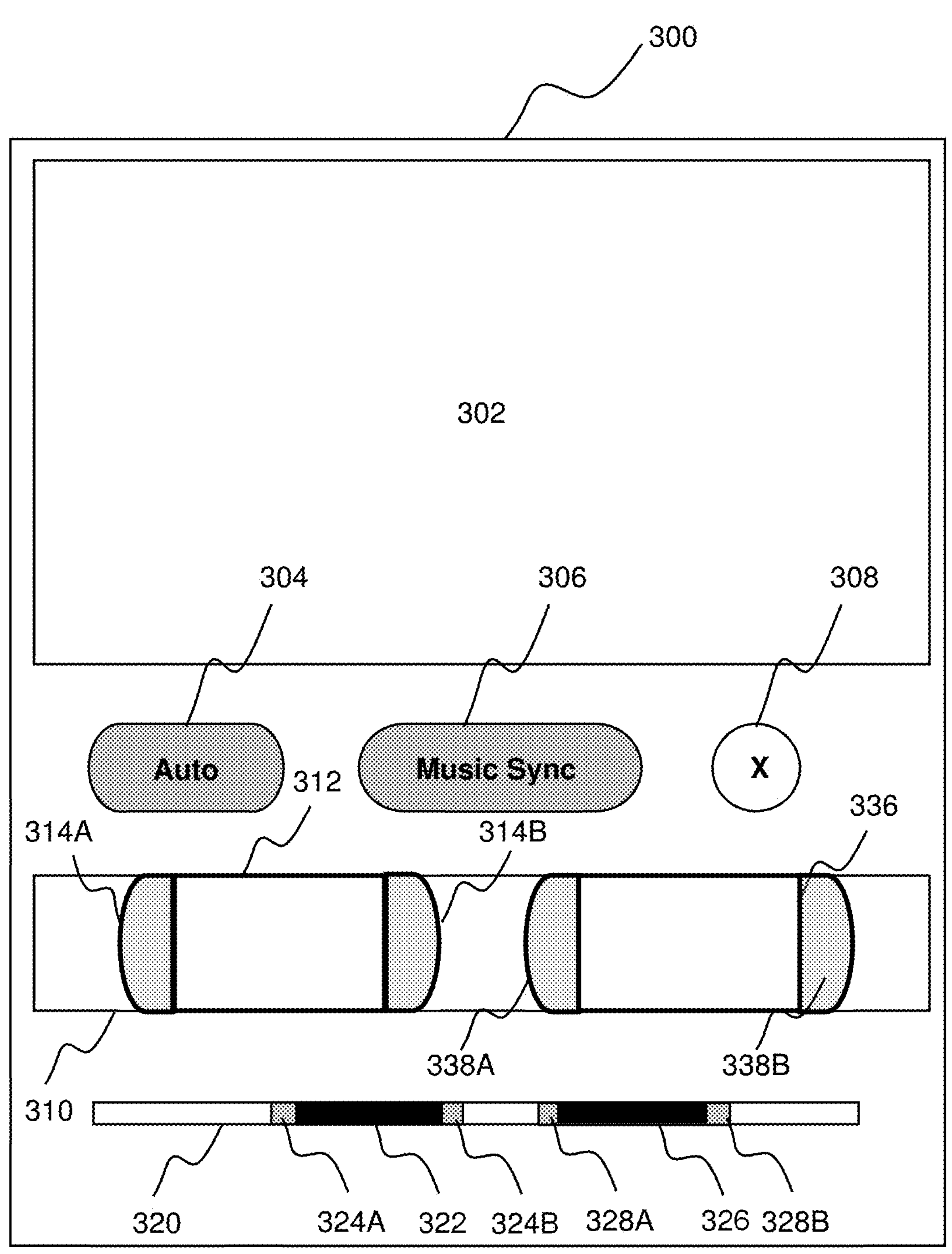
FIG. 3D illustrates example graphical user interface for indicating video editing decisions.

The graphical user interface 300 may enable user interaction with the automatic inclusion element 316 to change the automatically selected segment of the video. For example, a user may interact with the sides (e.g., handles, circles) of the automatic inclusion element 316 to change the length of the video segment. A user may drag the automatic inclusion element 316 along the timeline element 310 to change location of the segment within the progress length of the video. User modification of the automatically selected segment of the video (e.g., via user interaction with the automatic inclusion element 316) may change the automatically selected segment of the video into a manually selected segment of the video, and the automatic inclusion element 316 may be replaced with a manual inclusion element. Referring to FIG. 3D, the automatic inclusion element 316 may be changed into/replaced with a manual inclusion element 336 based on user interaction that increases the selected segment of the video. Shoulder elements 338A, 338B may appear within the graphical user interface 300 to visually indicate/represents portions of the video that were added to the video edit to maintain music synchronization in the video edit. In the summary timeline element 320, the summary automatic inclusion element 326 may be changed into/replaced with a manual inclusion element, with its length increased in accordance with the length change made by the user, and shoulder elements 328A, 328B may appear to visually indicate/represent portions of the video that were not manually selected, but were automatically selected to maintain music synchronization in the video edit.

Figure 3E:
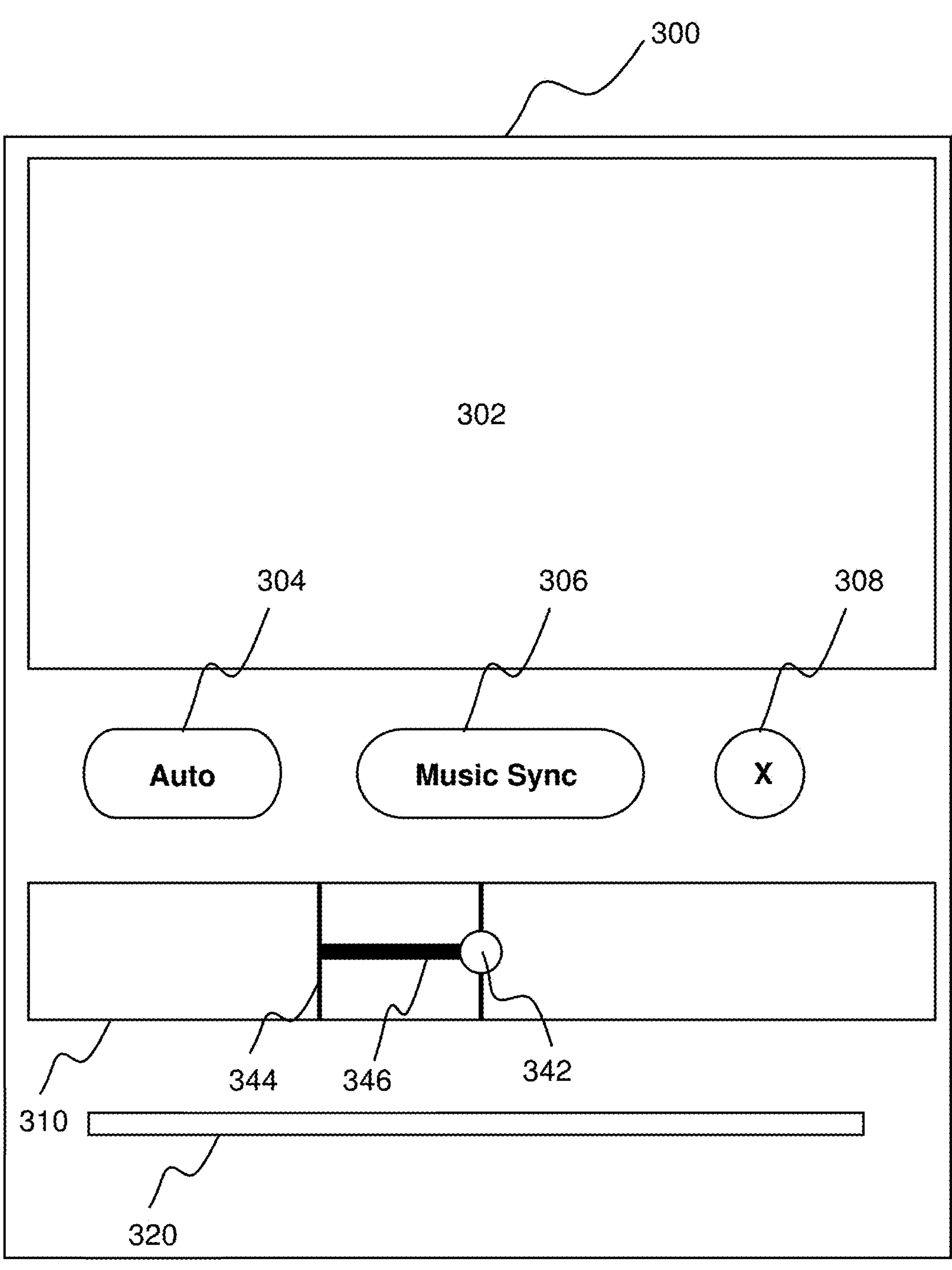
FIG. 3E illustrates example graphical user interface for indicating video editing decisions.

The graphical user interface may include one or more interface elements that enable a user to add/select additional segments of the video(s) for inclusion in the video edit. Such interface elements may be referred to as selection elements. An example selection element 342 is shown in FIG. 3E. The selection element 342 may be positioned at the middle of the timeline element 310. The selection element 342 may remained fixed at the middle of the timeline element 310. User interaction with the selection element 342 may mark an end (beginning, ending) of a segment to be selected for inclusion in the video edit. After user interaction with the selection element 342 to mark an end of the segment, the other end of the segment may be defined by the user via movement (dragging) of the timeline element 310 across the selection element 342. The portion of the timeline element 310 that is moved across the selection element 342 may be added to the segment.

For example, in FIG. 3E, after initial user interaction with the selection element 342, the timeline element 310 may have been moved to the left. A selection bar 346 may represent the amount of the timeline element 310 that was moved across the selection element 342. The selection bar 346 may represent the duration of the segment that has been selected for inclusion in the video edit. An end 344 may represent the beginning of the segment. The time point represented by the end 344 may have been the time point that was located at the center of the timeline element 310 when the selection element 342 was initially interacted on by the user. The end 344 may have been moved to the left via user movement of the timeline element 310. The ending of the segment may be defined based on subsequent user interaction with the selection element 342. The ending of the segment may be set to the time point that is located at the center of the timeline element 310 when the selection element 342 is subsequently interacted on by the user. Other addition/selection of video segments for inclusion in the video edit are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

FIG. 2 illustrates method 200 for presenting an interface for indicating video editing decisions. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video edit information and/or other information may be obtained. The video edit information may define a video edit of a video. The video may have a progress length. The video edit of the video may include one or more segments of the video that have been selected for inclusion in the video edit. In some implementations, operation 201 may be performed by a processor component the same as or similar to the video edit information component 102 (Shown in FIG. 1 and described herein).

At operation 202, a graphical user interface may be presented on a display. The graphical user interface may include interface elements that convey information relating to the video edit. The interface elements may include a timeline element that represents the progress length of the video. The interface elements may include one or more inclusion elements that visually indicate the segment(s) of the video that have been selected for inclusion in the video edit. In some implementations, operation 202 may be performed by a processor component the same as or similar to the graphical user interface component 104 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for presenting an interface for indicating video editing decisions, the system comprising:

one or more physical processors configured by machine-readable instructions to:

obtain video edit information, the video edit information defining a video edit of a video, the video having a progress length, the video edit of the video including one or more segments of the video selected for inclusion in the video edit; and present a graphical user interface on a display, the graphical user interface including interface elements, the interface elements including:

a timeline element that represents a zoomed in portion of the progress length of the video;

a summary timeline element that represents an entirety of the progress length of the video; and a music-synchronization element that enables a user to turn on or turn off music synchronization of the video edit.

2. The system of claim 1, wherein the interface elements further include a first inclusion element positioned along the timeline element, the first inclusion element visually indicating that a first segment of the video has been selected for inclusion in the video edit.

3. The system of claim 2, wherein the interface elements further include a first summary inclusion element positioned along the summary timeline element, the first summary inclusion element positioned along the summary timeline element corresponding to the first inclusion element positioned along the timeline element, the first summary inclusion element visually indicating that the first segment of the video has been selected for inclusion in the video edit.

4. The system of claim 3, wherein the interface elements further include a second summary inclusion element positioned along the summary timeline element, the second summary inclusion element visually indicating that a second segment of the video has been selected for inclusion in the video edit.

5. The system of claim 4, wherein the interface elements do not include a second inclusion element positioned along the timeline element based on the second segment of the video being outside the zoomed in portion of the progress length of the video represented by the timeline element, the second inclusion element corresponding to the second summary inclusion element.

6. The system of claim 3, wherein the first inclusion element positioned along the timeline element includes one or more shoulder elements based on the music synchronization of the video edit being turned on.

7. The system of claim 6, wherein the first summary inclusion element positioned along the summary timeline element includes one or more summary shoulder elements based on the music synchronization of the video edit being turned on.

8. The system of claim 6, wherein an individual shoulder element visually represents a portion of the video not manually selected for inclusion in the video edit.

9. The system of claim 1, wherein the interface further includes an automatic selection element that enables the user to turn on or turn off automatic selection of video segments for inclusion in the video edit.

10. A method for presenting an interface for indicating video editing decisions, the method performed by a computing system including one or more processors, the method comprising:

obtaining, by the computing system, video edit information, the video edit information defining a video edit of a video, the video having a progress length, the video edit of the video including one or more segments of the video selected for inclusion in the video edit; and presenting, by the computing system, a graphical user interface on a display, the graphical user interface including interface elements, the interface elements including:

a timeline element that represents a zoomed in portion of the progress length of the video;

a summary timeline element that represents entirety of the progress length of the video; and a music-synchronization element that enables a user to turn on or turn off music synchronization of the video edit.

11. The method of claim 10, wherein the interface elements further include a first inclusion element positioned along the timeline element, the first inclusion element visually indicating that a first segment of the video has been selected for inclusion in the video edit.

12. The method of claim 11, wherein the interface elements further include a first summary inclusion element positioned along the summary timeline element, the first summary inclusion element positioned along the summary timeline element corresponding to the first inclusion element positioned along the timeline element, the first summary inclusion element visually indicating that the first segment of the video has been selected for inclusion in the video edit.

13. The method of claim 12, wherein the interface elements further include a second summary inclusion element positioned along the summary timeline element, the second summary inclusion element visually indicating that a second segment of the video has been selected for inclusion in the video edit.

14. The method of claim 13, wherein the interface elements do not include a second inclusion element positioned along the timeline element based on the second segment of the video being outside the zoomed in portion of the progress length of the video represented by the timeline element, the second inclusion element corresponding to the second summary inclusion element.

15. The method of claim 12, wherein the first inclusion element positioned along the timeline element includes one or more shoulder elements based on the music synchronization of the video edit being turned on.

16. The method of claim 15, wherein the first summary inclusion element positioned along the summary timeline element includes one or more summary shoulder elements based on the music synchronization of the video edit being turned on.

17. The method of claim 15, wherein an individual shoulder element visually represents a portion of the video not manually selected for inclusion in the video edit.

18. The method of claim 10, wherein the interface further includes an automatic selection element that enables the user to turn on or turn off automatic selection of video segments for inclusion in the video edit.

19. A system for presenting an interface for indicating video editing decisions, the system comprising:

one or more physical processors configured by machine-readable instructions to:

obtain video edit information, the video edit information defining a video edit of a video, the video having a progress length, the video edit of the video including one or more segments of the video selected for inclusion in the video edit; and present a graphical user interface on a display, the graphical user interface including interface elements, the interface elements including:

a timeline element that represents a zoomed in portion of the progress length of the video;

a summary timeline element that represents an entirety of the progress length of the video;

an automatic selection element that enables a user to turn on or turn off automatic selection of video segments for inclusion in the video edit;

a music-synchronization element that enables the user to turn on or turn off music synchronization of the video edit; and a first inclusion element positioned along the timeline element and a first summary inclusion element positioned along the summary timeline element, the first inclusion element and the first summary inclusion element visually indicating that a first segment of the video has been selected for inclusion in the video edit.

20. The system of claim 19, wherein based on the music synchronization of the video edit being turned on, the first inclusion element positioned along the timeline element includes one or more shoulder elements and the first summary inclusion element positioned along the summary timeline element includes one or more summary.

* * * * *